United States Patent
Sugimoto et al.

(10) Patent No.: US 7,618,173 B2
(45) Date of Patent: Nov. 17, 2009

(54) VEHICLE HEADLAMP

(75) Inventors: Atsushi Sugimoto, Shizuoka (JP); Kiyotaka Mochizuki, Shizuoka (JP); Naohisa Tatara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/705,972

(22) Filed: Feb. 13, 2007

(65) Prior Publication Data

US 2007/0195543 A1   Aug. 23, 2007

(30) Foreign Application Priority Data

Feb. 17, 2006   (JP)   ............... P.2006-041171

(51) Int. Cl.
*F21V 7/00*   (2006.01)
(52) U.S. Cl. ............... 362/518; 362/539; 362/532; 362/507; 362/512
(58) Field of Classification Search ............... 362/518, 362/539, 508, 523, 532
See application file for complete search history.

(56) References Cited

U.S. PATENT DOCUMENTS

| | | | | |
|---|---|---|---|---|
| 5,373,424 A | * | 12/1994 | Ishikawa | ............... 362/538 |
| 6,540,387 B2 | * | 4/2003 | Hashiyama et al. | ......... 362/538 |
| 7,044,624 B2 | * | 5/2006 | Taniuchi | ............... 362/539 |
| 7,118,260 B2 | * | 10/2006 | Tsukamoto et al. | ......... 362/517 |
| 2001/0040810 A1 | * | 11/2001 | Kusagaya | ............... 362/351 |
| 2003/0072164 A1 | * | 4/2003 | Watanabe et al. | ........... 362/465 |
| 2004/0213012 A1 | * | 10/2004 | Fukawa et al. | ............... 362/539 |
| 2004/0228139 A1 | * | 11/2004 | Taniuchi | ............... 362/539 |
| 2005/0201117 A1 | | 9/2005 | Sugimoto et al. | |
| 2006/0013005 A1 | * | 1/2006 | Jiao | ............... 362/382 |
| 2006/0023465 A1 | * | 2/2006 | Ohshio et al. | ............... 362/514 |

FOREIGN PATENT DOCUMENTS

JP   2005-259549   9/2005

* cited by examiner

*Primary Examiner*—Sandra L O'Shea
*Assistant Examiner*—Evan Dzierzynski
(74) *Attorney, Agent, or Firm*—Fish & Richardson P.C.

(57) ABSTRACT

A vehicle headlamp includes a lamp 110 having shade switching means 140 for providing a desired light distribution pattern by blocking a portion of light emitted from a light source. Light distribution pattern switching controlling means controls the shade switching means 140 in response to receipt of an instruction of switching a light distribution pattern of the lamp. Leveling means 130 controls deflection of an optical axis of the lamp in a vertical direction. The light distribution pattern switching controlling means controls the shade switching means 140 such that a cut line is formed by a height substantially the same as that of a cut line of high beam when an instruction of switching to a light distribution pattern of "remote optically recognizing beam" is received and controls the leveling means 130 such that the cut line is formed by a height of a cut line requested for "middle beam".

11 Claims, 10 Drawing Sheets

FIG. 4A
LOW BEAM

FIG. 4B
MIDDLE BEAM

FIG. 4C
HIGH BEAM

FIG. 8A
HIGH-MIDDLE BEAM HS

FIG. 8B
LOW-MIDDLE BEAM MS

FIG. 8C
RIGHT-MIDDLE BEAM RS

FIG. 9

FIG. 10A
LOW BEAM

FIG. 10B
MIDDLE BEAM

FIG. 10C
HIGH BEAM

VEHICLE HEADLAMP

This application claims the benefit of priority of Japanese Patent Application No. 2006-041171, filed on Feb. 17, 2006. The disclosure of the priority application is incorporated by reference herein.

BACKGROUND OF THE INVENTION

1. Field of the Invention

The present disclosure relates to a headlamp of a vehicle such as an automobile or the like and, in particular, it relates to a vehicle headlamp capable of being switched to multiple different light distribution patterns.

2. Related Art

Figure 10A:
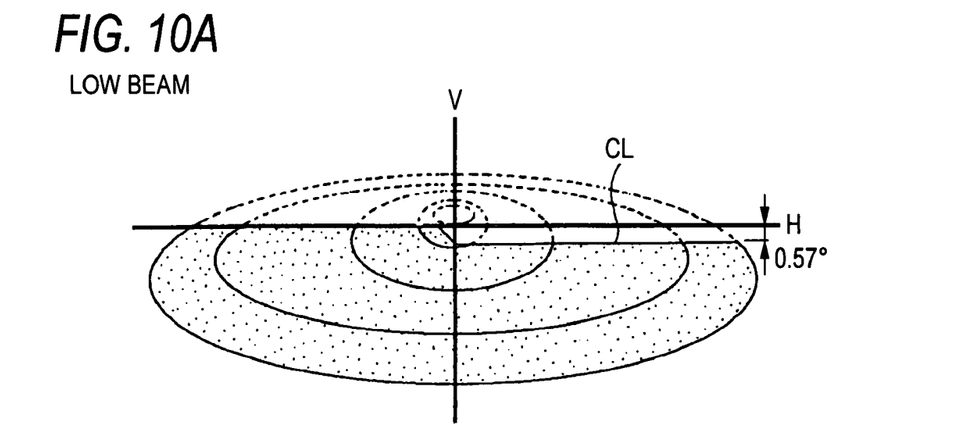
FIGS. 10A to 10C illustrate known light distribution pattern diagrams.
Figure 10B:
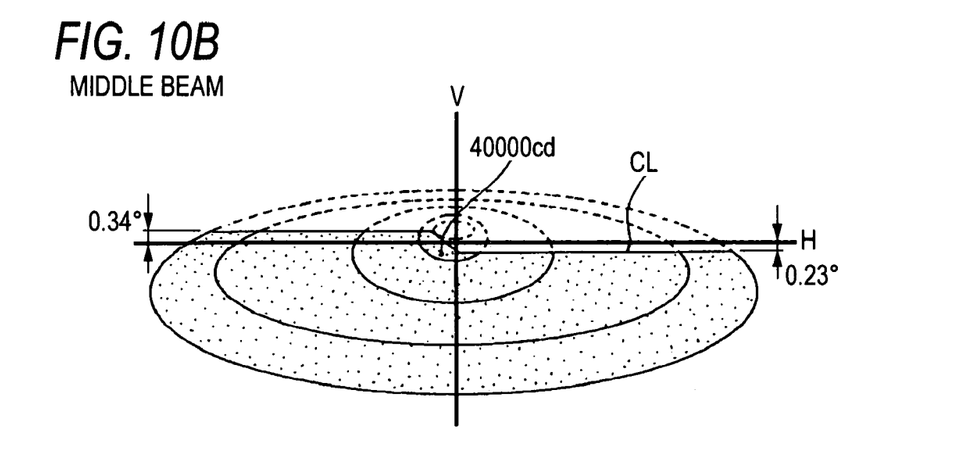
Figure 10C:
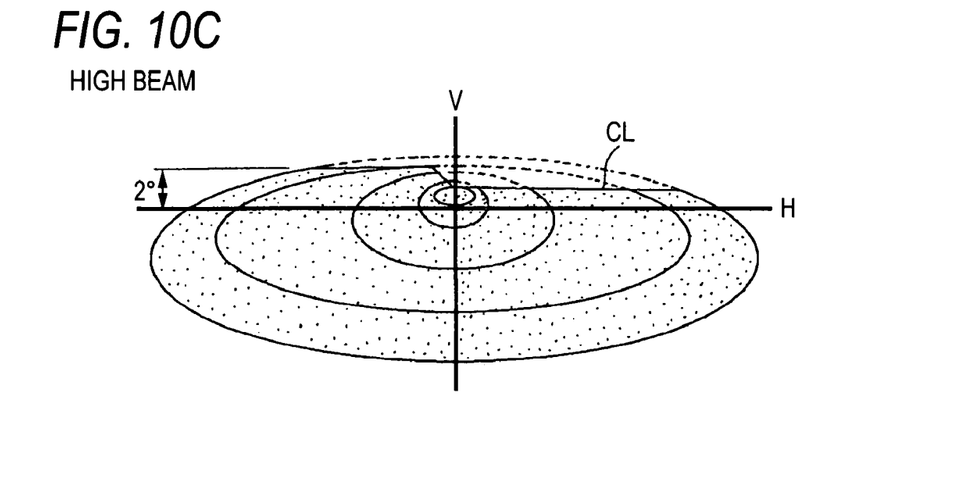

A headlamp of an automobile or the like is designed to be able to switch a light distribution pattern in accordance with a traveling state and is generally designed to be able to be switched to "low beam" and a "high beam." The "low beam" (also referred to as "passing beam") preferably constitutes a light distribution pattern which does not distract the driver of a vehicle traveling in an opposite lane or a vehicle traveling ahead in the same direction. The "high beam" (also referred to as "running beam") preferably constitutes a light distribution pattern for illuminating a wide range on a front side. In recent years, there also has been proposed a vehicle headlamp capable of being switched to a "middle beam" (also referred to as "motorway beam" or "remote optically recognizing beam") constituting a light distribution pattern for illuminating a range of the front side as wide as possible so as not to distract the driver of a vehicle traveling in an opposite lane. As shown by FIG. 10A, a "low beam" light distribution pattern is constituted by a light distribution pattern for illuminating a lower side region constituting a cut line CL by a position of an angle of 0.57° slightly lower than a horizontal line (hereinafter, simply referred to as a light distribution horizontal line) H on the light distribution pattern at a region on a right side of a vertical line (hereinafter, simply referred to as light distribution vertical line) V constituting a reference by an optical axis of a headlamp and constituting a cut line CL by a height of the light distribution horizontal line H on a left side region. As shown by FIG. 10C, a "high beam" light distribution pattern is constituted by a light distribution pattern for illuminating a region having a cut line CL slightly on an upper side of the light distribution horizontal line H on left and right sides of the light distribution vertical line V, and at a position of an angle of 2° on an upper side of the light distribution horizontal line H particularly on a left side region. As shown by FIG. 10B, a "middle beam" light distribution pattern is constituted by a light distribution pattern for illuminating a lower side region constituting a cut line CL by a position of an angle of 0.23° slightly on a lower side of the light distribution horizontal line H on a right side region of the light distribution vertical line V and constituting a cut line CL by a position of an angle of 0.34° slightly on an upper side of the light distribution horizontal line H on a left side region. In the respective diagrams, a broken line indicates a light distribution region when light is not blocked by a shade, and a luminance intensity becomes high toward the center as indicated by outline equi-luminous intensity lines in the light distribution patterns of the respective diagrams.

A known headlamp capable of switching the light distribution patterns has a shade for partially blocking light emitted from a light source inside the headlamp and changing a pattern of light emitted from the headlamp by changing a position of the shade. For example, Japanese paten document JP-A-2005-259549 discloses a headlamp for switching a light distribution pattern by switching a shade for blocking light by providing a rotatable rotary shade as in a hydraulic turbine radially arranged with multiple shades having different shapes at a position on a front side of a light source and switching the shades for blocking light by controlling a position of rotating the rotary shade.

According to the headlamp of JP-A-2005-259549, a desired light distribution pattern is provided by changing the illuminating range by blocking a portion of light of a constant light distribution pattern emitted from the light source by the rotary shade. In other words, the respective light distribution patterns are formed by cutting out portions of the light distribution pattern emitted from the light source. As shown by FIG. 10B, according to the "middle beam" light distribution pattern, a region along the light distribution horizontal line H is blocked. Thus, in the "middle beam" light distribution pattern, a region having a high luminous intensity at a vicinity of the optical axis of the headlamp of a moving vehicle is blocked, and a luminous intensity of a remote region ahead of the vehicle becomes low. Therefore, a problem can arise because insufficient remote optical illumination is achieved in the "middle beam" light distribution pattern According to the headlamp of JP-A-2005-259549, a state occurs in which illumination is dark by temporarily switching to a state of "low beam" as a result of a relationship of aligning the shades of the rotary shade, when switched from "middle beam" to "high beam." Such a state may adversely affect the driver. This is because the rotary shade of the headlamp of JP-A-2005-259549 switches the shades by being rotated reciprocally and, when the different light distribution patterns are switched, a light distribution pattern occurs other than the desired light distribution pattern over time. This also poses a difficulty in switching to a desired light distribution pattern when traveling at high speed.

SUMMARY

In one aspect, the disclosure relates to a vehicle headlamp capable of improving remote recognizability in a "middle beam" light distribution pattern and capable of switching a light distribution pattern when traveling at high speeds.

In a particular implementation, a vehicle headlamp includes a lamp having shade switching means for providing a desired light distribution pattern by blocking a portion of light emitted from a light source. The headlamp also includes a light distribution pattern switching controlling means for controlling the shade switching means when an instruction of switching a light distribution pattern of the lamp is received. The vehicle headlamp further includes leveling means for controlling deflection of an optical axis of the lamp in a vertical direction, wherein the light distribution pattern switching controlling means controls the shade switching means and controls the leveling means in switching the light distribution pattern. In particular, the shade switching means can change at least a height of a cut line in the light distribution pattern, and the light distribution pattern switching controlling means controls an inclination in an up and down direction of the optical axis of the lamp by the leveling means in correspondence with the height of the cut line of the shade switching means.

For example, the light distribution pattern switching controlling means can be designed to control the shade switching means such that the cut line is constituted by a height the same as a height of a cut line of a high beam when an instruction to switch to a light distribution pattern of "remote optically recognizing beam" (i.e., "middle beam") is received and to control the leveling means such that the cut line is constituted by a height of a cut line requested for "middle beam." Further, the shade switching means can include a rotary shade designed to be able to change the height of the cut line at multiple rotational positions, and the rotational shade can form at least light distribution patterns of a low beam and a high beam.

One or more of the following advantages are present in some implementations. The light distribution pattern of "middle beam" can be provided by utilizing, for example, a shade for constituting the "high beam" light distribution pattern. Therefore, the "middle beam" light distribution pattern can be provided by utilizing a region having a high luminous intensity in the "high beam" light distribution pattern as it is, particularly, can improve a luminous intensity of a center region of the light distribution pattern and can improve remote optical recognizability in "middle beam." By simultaneously carrying out switching of the shade switching means and a control of the leveling means, a number of switching shades necessary for providing different light distribution patterns can be made smaller than the number of the light distribution patterns, and switching of beams can be carried out at high speed.

Other features and advantages will be readily apparent from the following detailed description, the accompanying drawings and the claims;

DETAILED DESCRIPTION OF THE EXEMPLARY EMBODIMENTS

According to an implementation of the invention, it is preferable to set a time for starting to control the leveling means before the time for starting to control shade switching means. This can prevent a situation in which only a cut line becomes high before switching to a "middle beam" light distribution pattern, and can prevent the driver of a vehicle traveling on an opposite lane from being distracted. It is preferable to set a time for controlling the leveling means to the same time as for controlling the shade switching means. A situation in which a light distribution pattern which differs from any of the previously-set light distribution patterns in the midst of switching light distribution patterns and a strange feeling is avoided for the driver.

Embodiment 1

Figure 1:
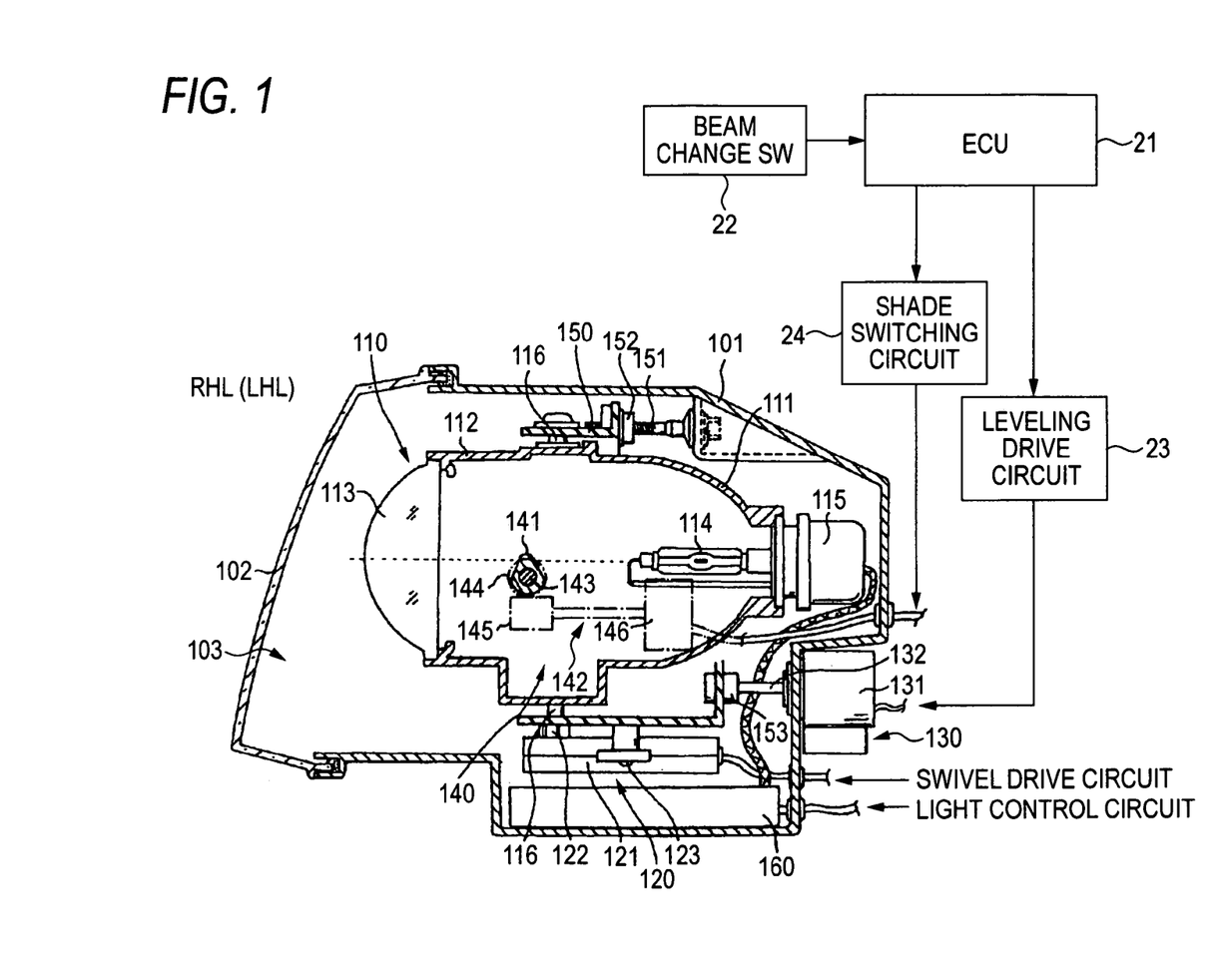
FIG. 1 is a view showing a sectional structure and circuit connection of a headlamp of Embodiment 1.

Embodiment 1 of the invention will be explained in reference to the drawings. FIG. 1 is a sectional view of an embodiment applying the invention to left and right headlamps (headlamps) of an automobile. The drawings show an example of a headlamp capable of deflecting (swiveling) an irradiating direction to left and right sides. The left and right headlamps basically have the same design. The headlamp RHL on the right side is illustrated. The headlamp RHL includes a lamp body 101 formed in a shape of a vessel whose front face is opened. The front face opening is attached with a transparent cover 102 to form a lamp chamber 103. A projector-type lamp unit 110 is mounted inside the lamp chamber 103. The lamp unit 110 is designed to be able to control deflection of an irradiating direction respectively in horizontal left and right directions and vertical up and down directions by a swiveling mechanism 120 and a leveling mechanism 130. A shade for forming a light distribution pattern can be switched by a shade switching mechanism 140. FIG. 1 illustrates a ballast apparatus 160 constituting a light source circuit for switching on a light source of the lamp unit 110.

Figure 2:
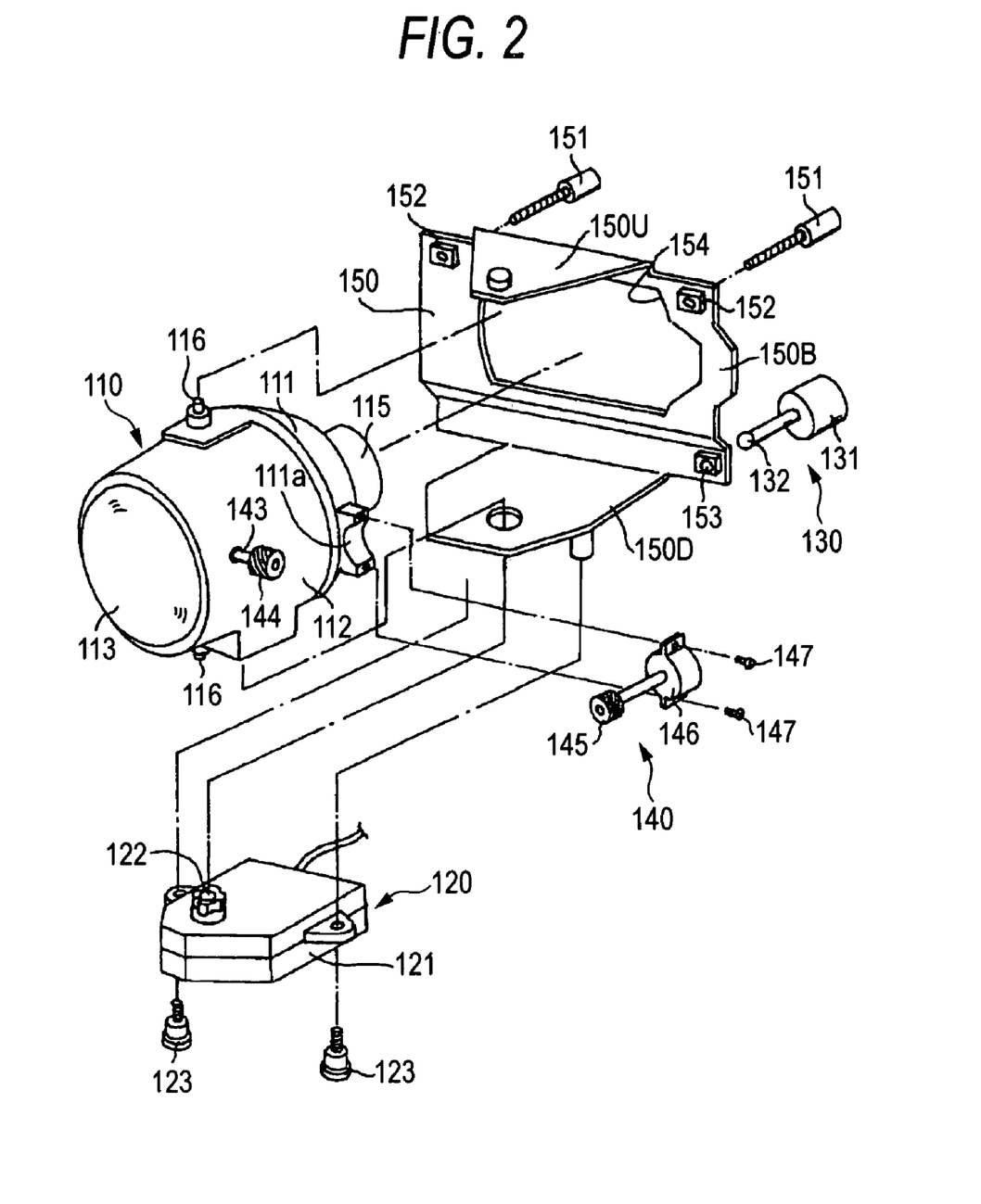
FIG. 2 is a disassembled perspective view of a portion of Embodiment 1.

FIG. 2 is a disassembled perspective view of a portion of the headlamp RHL. The lamp unit 110 is arranged inside a frame 150 bent substantially in a channel-like shape, and is pivotably supported in a horizontal direction around rotational support shafts 116 at an upper portion and a lower portion of a holder 112 so as to be interposed by an upper plate 150U and a lower plate 150D of the frame 150 in an up an down direction, and so as to be disposed at a back plate 150B of the frame 150. The lamp unit 110 is pivotable in the horizontal left and right directions by the swiveling mechanism 120. The swiveling mechanism 120 includes an actuator 121 constituting a pivoting drive source. The actuator 121 is fixed to a lower face of the lower plate 150D of the frame 150 by a fixing screw 123. A rotating output shaft 122 is projected from an upper face of the actuator 121, and the rotating output shaft 122 is connected to the rotational support shaft 116 on a lower side of the lamp unit 110. Inside the actuator 121 is a motor (not illustrated in the drawing) and a speed change mechanism for changing a speed of a rotating output of the motor and the like. The rotating output shaft 122 is rotated by rotating the motor. When electricity conducted to the actuator 121 is controlled, the lamp unit 110 is pivoted in a desired angular range along with the rotating support shafts 116 by the rotating output shaft 122, an optical axis of the lamp unit 110, that is, the irradiating direction is inclined in the left and right direction to carry out swiveling control.

The frame 150 is supported by the lamp body 101 by aiming screws 151 screwed to aiming nuts 152 arranged respectively at two left and right portions of an upper side of the back plate 150B. The frame 150 is connected to the leveling mechanism 130 at a ball bearing 153 arranged at a lower side portion. The leveling mechanism 130 includes a leveling motor 131 having a connecting rod 132 capable of being operated to move forward and rearward along front and rear directions of the lamp unit 110. The leveling motor 131 is fixed to an outer side face of the lamp body 101, and a front end portion of the connecting rod 132 is fitted to the ball bearing 153 of the frame 150. When the leveling motor 131 is driven, the connecting rod 132 is operated to move forward and rearward in an axial direction, the frame 150 connected to the connecting rod 132 is pivoted in a vertical direction by constituting fulcra by the two aiming screws 151 of the upper side, and the optical axis of the lamp unit 110 arranged inside the frame 150. That is, the irradiating direction is inclined in an up and down direction to carry out leveling control. The inclination in the horizontal left and right direction and the inclination in the vertical direction of the frame 150 are adjusted by moving the two portions of the upper side of the frame 150 in the front and rear direction independently of each other by adjusting the two aiming screws 151 to rotate by manual operation. Adjustment by the aiming screw 151 is for adjusting the optical axis of the lamp unit 110 to direct it in the up and down direction when an automobile is in a predetermined state.

Figure 3A:
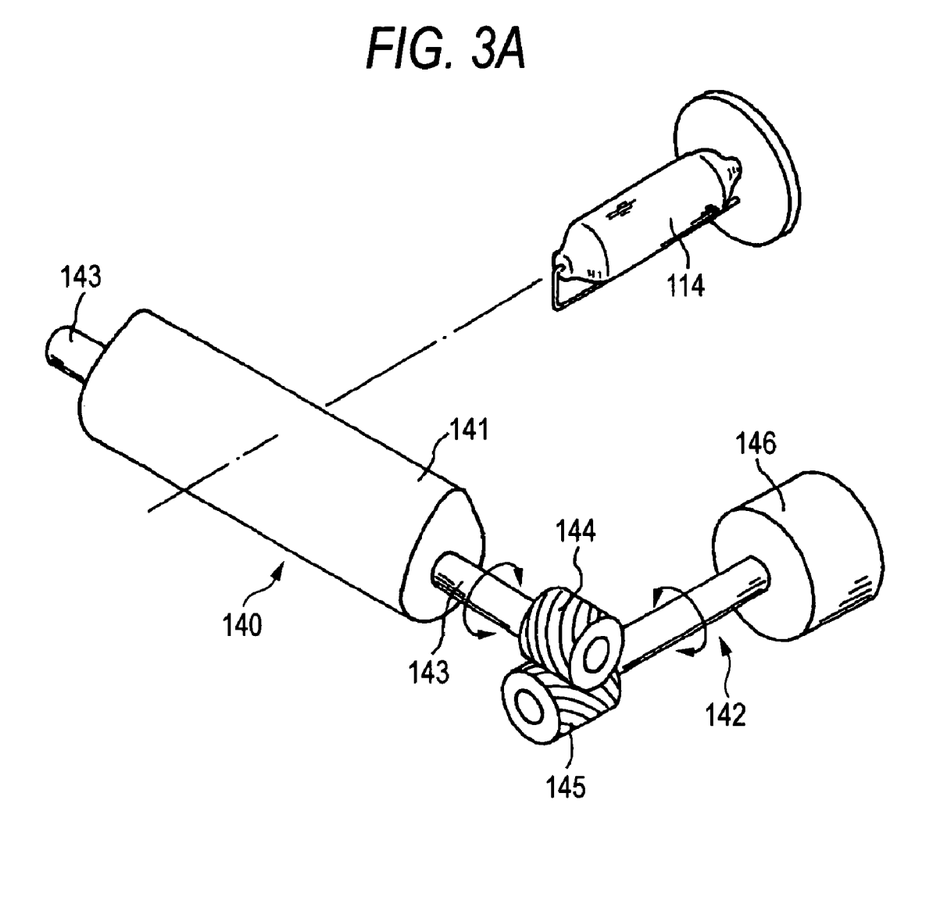
FIGS. 3A and 3B illustrate perspective views showing a design of a shade switching mechanism.

As shown by FIG. 1 and FIG. 2, according to the lamp unit 110, a housing thereof is formed by a reflector 111 in the shape of an ellipsoid, the holder 112 connected to a front edge portion of the reflector 111, and a lens 113 fixed to a front edge portion of the holder 112. The lamp unit 110 is attached to a discharge bulb 114 that serves as a light source by a socket 115 attached to a bulb attaching hole provided at a back face of the reflector 111. The lamp unit 110 is attached with the shade switching mechanism 140 for switching the shade for switching a light distribution pattern by restricting light emitted from the discharge bulb 114. The shade switching mechanism 140 is formed by a rotary shade 141 and a shade driving portion 142 for driving to rotate the rotary shade 141. FIG. 3A is a perspective view showing an outline of the shade switching mechanism 140. Both ends of the rotary shade 141 include rotating shafts 143 directed in the horizontal direction orthogonal to the optical axis of the lamp unit 110 and axially supported by the holder 112, an axial end portion of the rotating shaft 143 is projected through the holder 112 to its exterior. The rotary shade 141 makes a light blocking region of light emitted from the discharge bulb 114 differ in accordance with a rotational position when rotated around the rotating shaft 143 to form different light distribution patterns. The shade driving portion 142 is formed by a driven helical gear 144 attached to the one end portion of the rotating shaft 143 and a drive helical gear 145 that meshes with the driven helical gear 144 and by directing a rotational axis line in a direction in parallel with the optical axis of the lamp unit 110, and by a shade motor 146 for driving to rotate the drive helical gear 145. The shade motor 146 is formed by a stepping motor fixedly supported by a screw 147 at a motor sheet 111a provided integrally with an outer side face of the reflector 111 of the lamp unit 110, and is controlled to pivot reciprocally within a desired rotational angle range. Although according to Embodiment 1 the drive helical gear 145 is attached to the rotating output shaft of the shade motor 146, a pertinent speed reducing mechanism may be interposed therebetween.

Figure 3B:
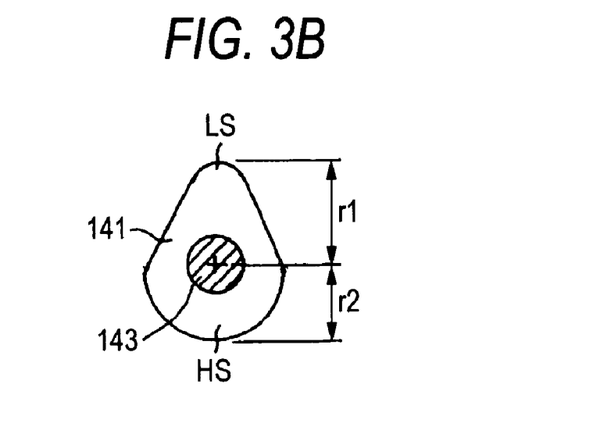

The rotary shade 141 is formed in a shape having two different radius dimensions r1, r2 in a circumferential direction as shown by a sectional shape thereof in a direction orthogonal to the rotating shaft 143 in FIG. 3B. Portions having the different radius dimensions are formed as shades for providing respective different light distribution patterns. A first circumferential portion in the circumferential direction forms a low beam shade LS having a large radius dimension for forming a "low beam" light distribution pattern, and a second circumferential portion opposed thereto in a direction of 180 degrees (i.e., in a diameter direction) forms a high beam shade HS having a small radius dimension for forming a "high beam" light distribution pattern. Although the low beam shade LS and the high beam shade HS are actually bent along the optical axis, these are shown by linear shapes for convenience of explanation. The rotary shade 141 is formed by a shape for blocking light such that a light distribution pattern of light emitted from the lamp unit 110 forms the light distribution pattern shown in FIG. 4A when the low beam shade LS is rotated to its light blocking position (i.e., in a vertical upper direction of FIG. 1). The rotary shade 141 is formed by a shape for blocking light such that the light distribution pattern of light emitted from the lamp unit becomes a light distribution pattern shown in FIG. 4C when the high beam shade is rotated to its light blocking position. Either of the low beam shade LS and the high beam shade HS can be selected to be rotated to the light blocking position by switching the rotational position of the rotary shade 141 by controlling the shade motor 146 of the shade driving portion 142 to rotate reciprocally.

As shown by FIG. 1, the leveling motor 131 is connected to a leveling drive circuit 23, and the shade motor 146 is connected to a shade switching circuit 24. The leveling drive circuit 23 and the shade switching circuit 24 are respectively connected to ECU (Electronic Control Unit) 21, and are controlled by ECU 21. ECU 21 is connected with a beam change switch 22 operated by a driver to switch beams of the headlamp. ECU 21 controls the leveling drive circuit 23 simultaneously with controlling the shade switching circuit 24 based on beam switching information provided when the beam change switch 22 is operated. The beam change switch 22 is designed to be able to be switched to "low beam", "high beam" or "middle beam." The actuator 121 is connected to a swivel drive circuit, and the ballast apparatus 160 is connected to a light control circuit (not shown) The swivel drive circuit and the light control circuit also are controlled by ECU 21.

Figure 5:
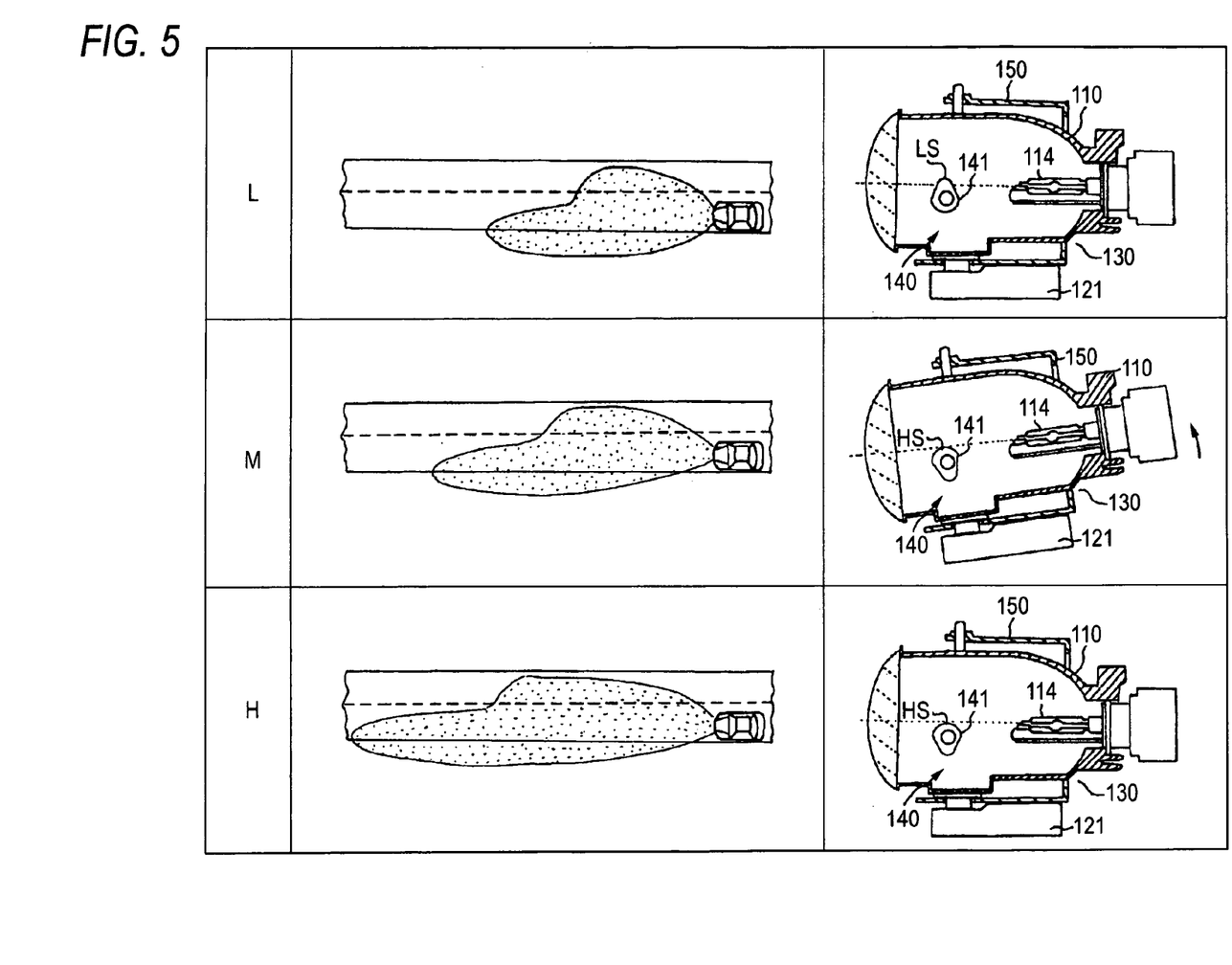
FIG. 5 illustrates plane views of light distribution patterns and vertical sectional views for explaining the operation of a shade switching mechanism.

An explanation will be given of beam switching operation of the headlamp having the foregoing design. When the beam change switch 22 is operated at a driver's seat of an automobile, beam switching information is provided to ECU 21, which controls a position of rotating the rotary shade 141 by driving the shade motor 146 of the shade switching mechanism 140 by the shade switching circuit 24 based on the beam switching information. Simultaneously, ECU 21 controls the optical axis of the lamp unit 110 in the up and down direction by driving the leveling motor 131 of the leveling mechanism 130 by the leveling drive circuit 23. Thus, a light distribution pattern of the headlamp is controlled as shown by FIG. 5.

[Switch to "Low Beam: L of FIG. 5"]

Figure 4A:
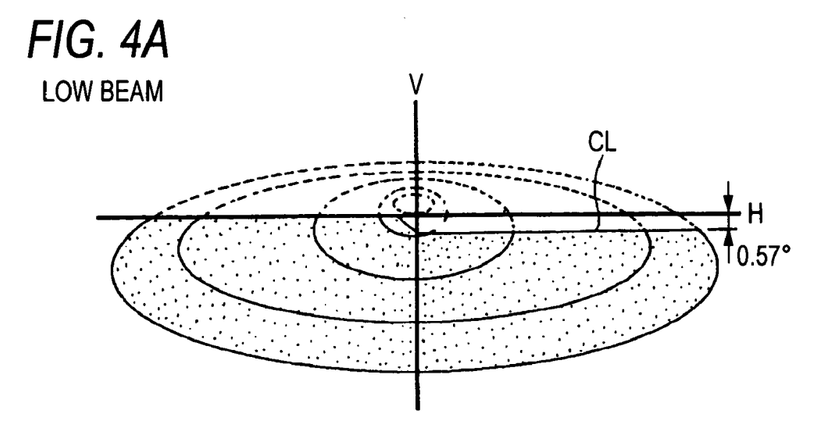
FIGS. 4A to 4C illustrate light distribution pattern diagrams switched by Embodiment 1.

When the beam change switch 22 is set to "low beam," ECU 21 brings the rotary shade 141 of the shade switching mechanism 140 into a low beam shade LS state by the shade switching circuit 24. That is, the rotary shade 141 is set to the low beam shade (LS) state by being controlled to pivot to a predetermined position by pivoting the drive helical gear 145 by rotating the shade motor 146 and pivoting the driven helical gear 144 brought in mesh therewith. The low beam shade LS is brought to a state in which the circumferential portion having the long radius dimension of the rotary shade 141 is rotated to the light blocking position and therefore, light emitted from the discharge bulb 114 of the lamp unit 110 is irradiated upward. At this point, ECU 21 sets the leveling mechanism 130 to an initial state by controlling the leveling motor 131 by the leveling drive circuit 23, and the optical axis of the lamp unit 110 is set to a predetermined initial position. As shown by FIG. 4A, a light distribution pattern of light irradiated from the lamp unit 110 becomes a light distribution pattern constituting a cut line by a position of an angle of 0.57° slightly on a lower side of light distribution horizontal line H at a region on a right side of light distribution vertical line V and constituting a cut line CL by a position of light distribution horizontal line H on a left side region, which is the same as the light distribution pattern of "low beam" shown in FIG. 10A. The cut line on the right side region of the light distribution vertical line V in the light distribution pattern of "low beam" is set to the angle of 0.57° on the lower side of the light distribution horizontal line. In FIG. 4A, a light distribution region—when light is not blocked by the shade—is indicated by a broken line and equi-luminous intensity lines are generally shown. The same applies to FIGS. 4B and 4C.

[Switch to "High Beam: H of FIG. 5"]

Figure 4B:
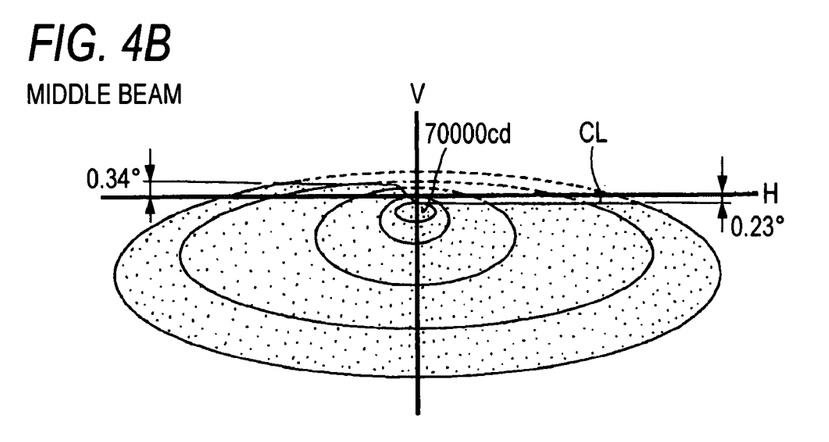
Figure 4C:
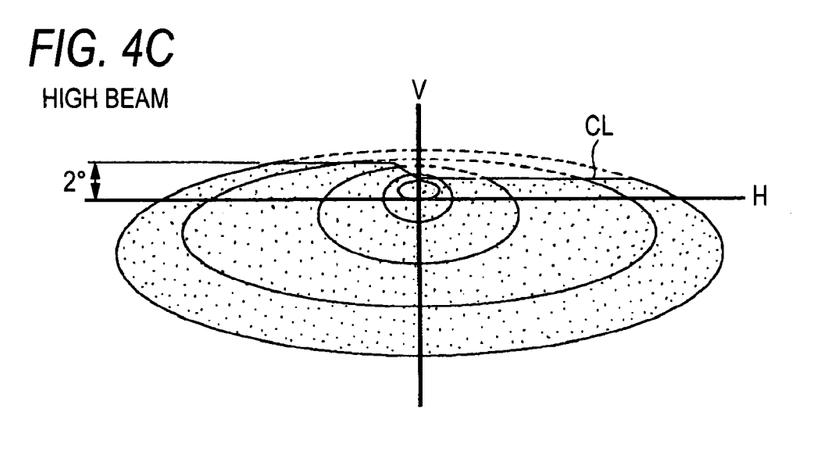

When the beam change switch 22 is set to "high beam," ECU 21 sets the rotary shade 141 to a high beam shade HS state by successively pivoting the drive helical gear 145 and the driven helical gear 144 by rotating the shade motor 146 by the shade switching circuit 24. The high beam shade HS is brought to a state in which the circumferential portion having a short radius dimension of the rotary shade 141 is rotated to the light blocking position, and light emitted from the discharge bulb 114 of the lamp unit 110 (which does not include the optical axis and irradiated upward therefrom) is blocked. At this point, ECU 21 controls the leveling motor 131 to the initial state by the leveling drive circuit 23, and the optical axis of the lamp unit 110 is set to the predetermined initial position. As shown by FIG. 4C, a light distribution pattern of light irradiated from the from the lamp unit 110 becomes a light distribution pattern in which the cut line CL on the left side of the light distribution vertical line V is slightly higher than that on the right side, and which includes the cut line CL at a position of an angle of 2° slightly on an upper side of the light distribution horizontal line H in the left side region, which is the same as the light distribution pattern of "high beam" shown in FIG. 10C. The cut line of the left side region of the light distribution vertical line V in the light distribution pattern of "high beam" is set to an angle of 2° upward from the light distribution horizontal line H.

[Switch to "Middle Beam: M of FIG. 5"]

When the beam change switch 22 is set to "middle beam," ECU 21 set the rotary shade 141 to the high beam shade (HS) state by successively pivoting the drive helical gear 145 and the driven helical gear 144 by rotating the shade motor 146 by the shade switching circuit 24. The state is the same as in the case of "high beam," and light emitted from the discharge bulb 114 of the lamp unit 110 (which does not include the optical axis and irradiated upward therefrom) is blocked. Simultaneously therewith, ECU 21 sets the optical axis of the lamp unit 110 to a position downward from the initial position by directing the leveling mechanism 130 slightly downward from the initial state by controlling the leveling motor 131 by the leveling drive circuit 23. Although the pattern of the light distribution pattern of light irradiated from the lamp unit 110 is the same as the "high beam" pattern, by downwardly deflecting the lamp unit 110, as shown by FIG. 4B, the light distribution pattern becomes a light distribution pattern constituting the cut line CL by a position slightly downward from the light distribution horizontal line H on the right side region of the light distribution vertical line V and constituting the cut line CL by a position slightly upward from the light distribution horizontal line H on the left side. According to the illustrated embodiment, the cut line CL of the left side region is set to an angle of 0.34° upward from the light distribution horizontal line H, and the cut line CL of the right side region is set to an angle of 0.23° downward from the light distribution horizontal line H. Further, when there is an allowance in an angle of moving down the optical axis of the lamp unit 110 to a lower side by the leveling mechanism 130, the "middle beam" can be set even when an angle of the cut line of "high beam" is increased from 2° to 3°. In comparison with the light distribution pattern of "middle beam" shown in FIG. 10B, the position of the cut line CL substantially stays the same. However, light of a region having a high luminous intensity including the optical axis of the lamp unit 110 is not blocked by the rotary shade 141 and, therefore, remote optical recognizability can be improved Whereas the luminous intensity of a center region of the light distribution pattern of FIG. 10B is 40000 cd, a luminous intensity of a center region of the light distribution pattern of FIG. 4B is 70000 cd.

According to the illustrated implementation of Embodiment 1, three light distribution patterns of "low beam," "high beam" "middle beam" can be switched. In other implementations, the rotary shade 141 can be provided with two of the low beam shade LS and the high beam shade HS. Therefore, a switching speed for switching the beams by rotating the rotary shade 141 can be performed at high speed. Further, even when switching to either of the beams, the headlamp is not switched to a beam other than an aimed beam during the switching process, and the driver is not adversely affected when the headlamp is switched.

Figure 6A:
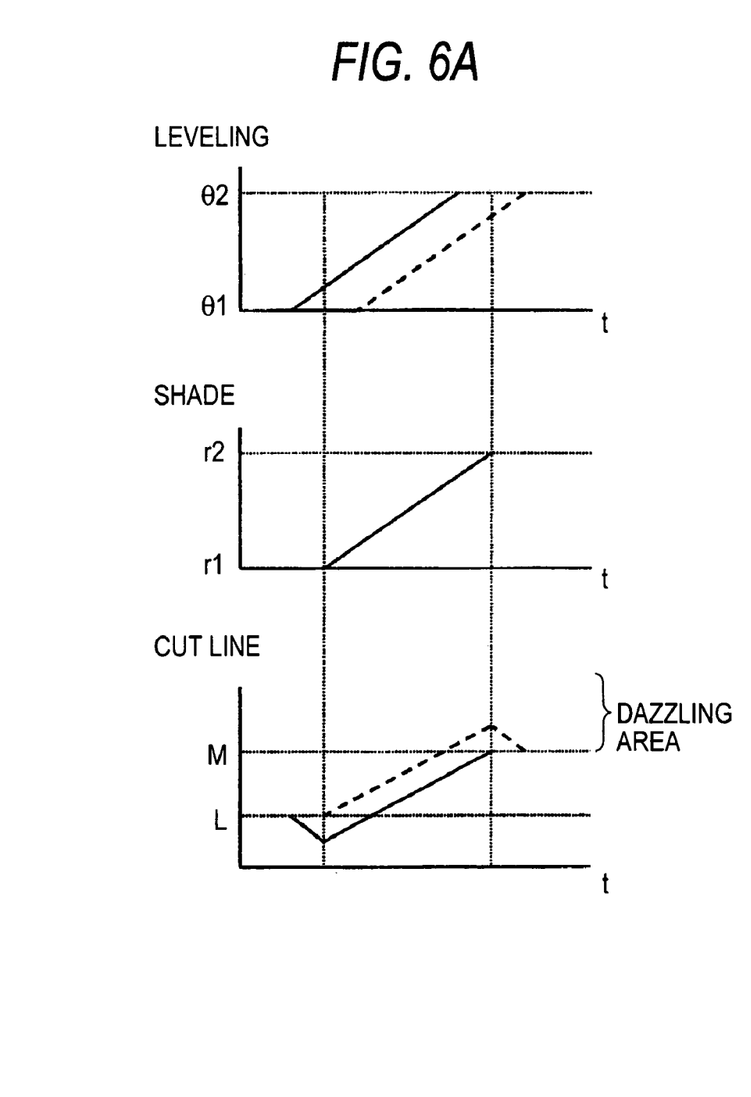
FIGS. 6A and 6B illustrate diagrams showing a correlation between timings of operating a leveling mechanism and a shade switching mechanism and a height of a cut line.

Here, in switching from "low beam" to "middle beam," as shown by a timing chart in operating the shade switching mechanism 140 and the leveling mechanism 130 and a height of the cut line CL at that occasion in FIG. 6A, the time of starting to control deflection of the optical axis of the lamp unit 110 downwardly from θ1 to θ2 by the leveling mechanism 130 is set before the time of starting to control the shade radius of the rotary shade 141 of the shade switching mechanism 140 from r1 to r2 of "high beam." That is, the optical axis of the lamp unit 110 is controlled prior to the time of starting to control the shade switching mechanism 140 by a small time period or simultaneously therewith. In this way, when (as shown by a broken line in the drawing), the start of controlling the leveling mechanism 130 is retarded from starting to control the shade switching mechanism 140, the light distribution pattern close to the "high beam" light distribution pattern temporarily, and there is a concern of adversely affecting the driver of a vehicle traveling in an opposite lane by bringing the cut line CL to a dazzling region. However, according to the embodiment, adversely affecting the driver can be avoided.

Figure 6B:
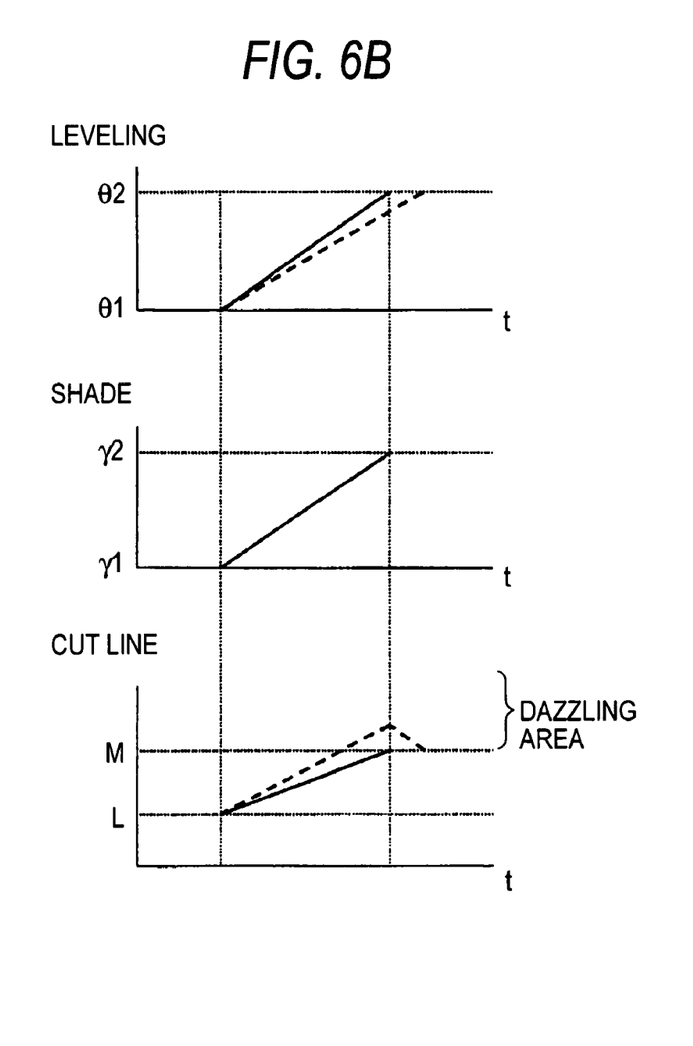

As shown by a timing chart showing the height of the cut line in operating the shade switching mechanism 140 and the leveling mechanism 130 in FIG. 6B, it is preferable provide a time period necessary for switching the shade switching mechanism 140 and a time period necessary for moving down the optical axis to a position of a predetermined angle on a lower side by the leveling mechanism 130 by the same time period. That is, it is preferable that operation of the shade switching mechanism 140 and operation of the leveling mechanism 130 are started simultaneously and finished simultaneously. Although (as shown by a broken line in the drawing), when the operation of the leveling mechanism 130 is finished retardedly after finishing operating the shade switching mechanism 140 and only the leveling mechanism 130 is operated, the light distribution pattern may differ from a previously-set light distribution pattern in the midst of switching the beams, and the driver may be adversely affected. According to the illustrated embodiment, such a situation can be avoided. Also, that can avoid adversely affecting the driver of a vehicle traveling in the opposite lane.

Embodiment 2

Figure 7:
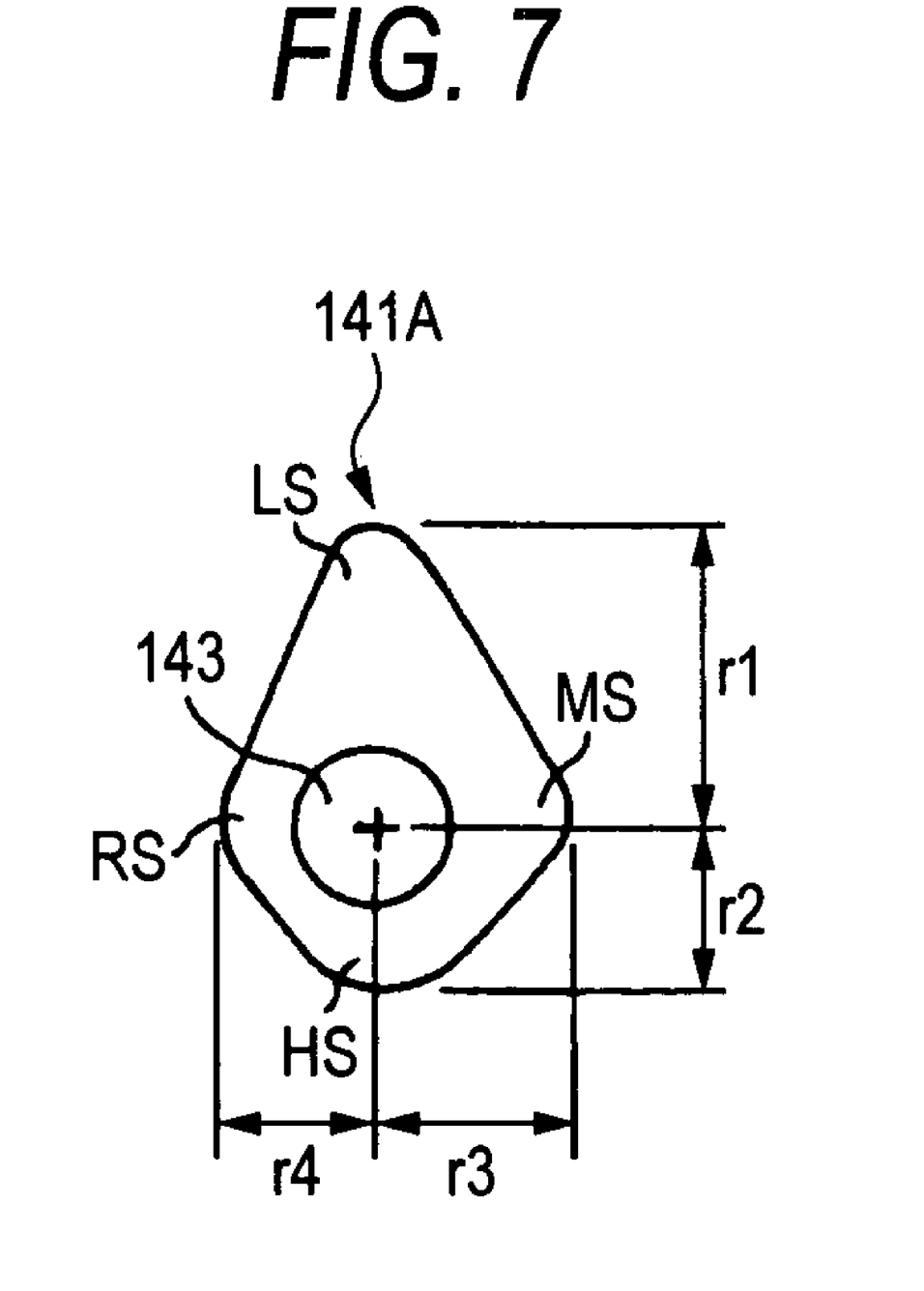
FIG. 7 is a sectional view of a rotary shade of Embodiment 2.

Embodiment 2 is a headlamp enabling switching of a beam to three different modes of middle beams ("high-middle beam," "low-middle beam" and "right-middle beam") in addition to "low beam" "high and beam" as in Embodiment 1. The design of the headlamp is similar to that of Embodiment 1, except the shape of a rotary shade. As shown by a sectional view in FIG. 7, the rotary shade 141A is partitioned into four portions in a circumferential direction, and respective first and second portions form the low beam shade LS having the radius r1 and the high beam shade HS having the radius r2 similar to Embodiment 1. A third portion forms a middle beam shade MS having a length of a radius r3 slightly shorter than that of the low beam shade LS and longer than that of the high beam shade HS. The middle beam shade MS differs from the high beam shade HS and the low beam shade LS in a shape of the shade. That is, a relationship of lengths of radii of the shade in left and right regions interposing the optical axis in a left and right direction differs from those of the high beam shade HS and the low beam shade LS. A fourth portion forms a right-high beam shade RS having a radius of r4 (=r2) and having a shape inverse to that of the high beam shade HS in a left and right direction along a rotational axis line.

Figure 8A:
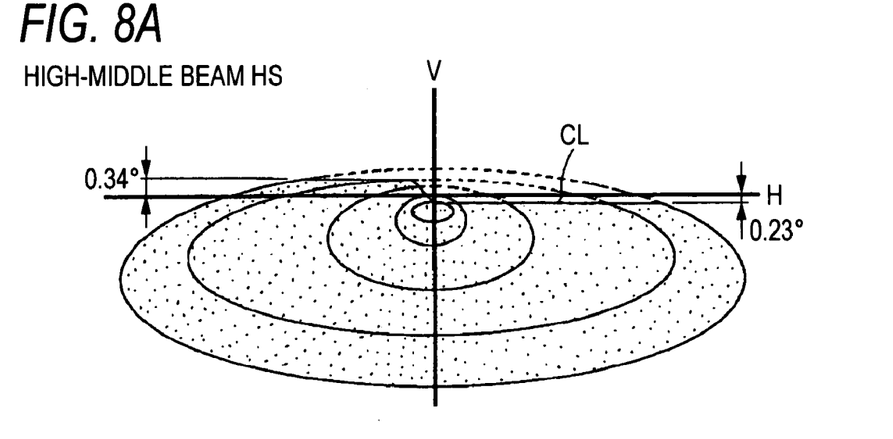
FIGS. 8A to 8C illustrate light distribution pattern diagrams of Embodiment 2.

According to Embodiment 2, beam switching to "low beam" and "high beam" is substantially the same as that of Embodiment 1. On the other hand, when switched to respective middle beams ("high-middle beam," "low-middle beam" and "right-middle beam") by the beam change switch 22, ECU 21 sets the optical axis of the lamp unit 110 to a position deflected downward from the initial position by controlling the leveling motor 131 by the leveling drive circuit 23. Simultaneously therewith, ECU 21 controls the position of rotating the rotary shade 141A of the shade switching mechanism 140 by the shade switching circuit 24 to rotate the high beam shade HS, the middle beam shade MS, the right-high beam shade RS to be disposed at upper positions in correspondence with the respective beams. "High-middle beam" is formed by a light distribution pattern the same as that of "middle beam" of Embodiment 1. The high beam shade HS is rotated so that it is disposed on an upper side, as shown by FIG. 8A, the light distribution pattern is formed by a light distribution pattern of illuminating a lower side region constituting the cut line CL by a position of an angle 0.23° slightly on an lower side of the light distribution horizontal line H at a region on a right side of the light distribution vertical line V and constituting the cut line CL by a position of an angle 0.34° slightly on an upper side of the light distribution horizontal line H in a left side region. Further, since a light distribution pattern is the same as the "middle beam" of Embodiment 1, a region having a high luminous intensity (including the optical axis of the lamp unit 110) is not blocked by the rotary shade 141A and, therefore, a luminous intensity of a region along the light distribution horizontal line H forming a destination of the traveling vehicle is pivoted and a light distribution pattern promoting remote optical recognizability can be realized without adversely affecting the driver of a vehicle traveling in the opposite lane.

Figure 8B:
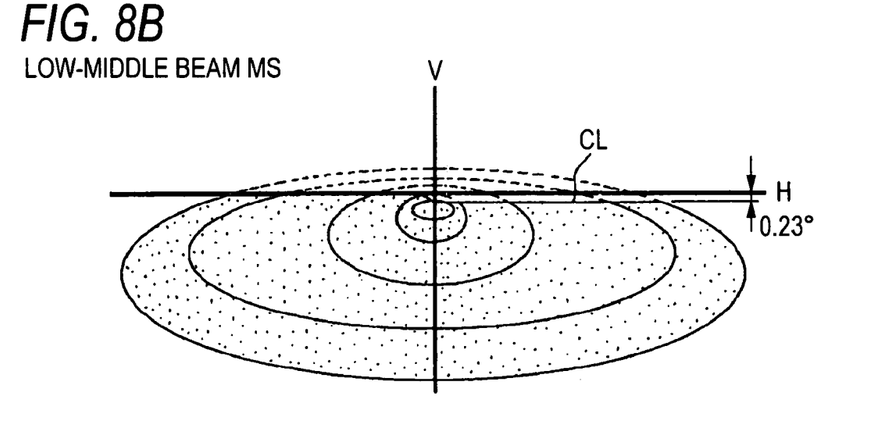

In "low-middle beam," the middle beam shade MS is rotated so that it is disposed on an upper side, as shown by FIG. 8B. The light distribution pattern is formed by a light distribution pattern of illuminating a lower side region constituting the cut line CL by a position of 0.23° slightly on a lower side of the light distribution horizontal line H at a region on a right side of the light distribution vertical line V and constituting the cut line CL by a position along the light distribution horizontal line H at a left side region. A region having a high luminous intensity (including the optical axis of the lamp unit 110) is not blocked by the rotary shade 141A and, therefore, a luminous intensity of a region along the light distribution horizontal line H forming the destination of the moving vehicle is similar to "high-middle beam." According to the "low-middle beam," by forming the shape of the middle beam shade MS different from that of other shades as described above, a light distribution pattern can be obtained in which a vehicle traveling in an opposite lane can be prevented from being adversely affected. Likewise, a pedestrian on the road shoulder is prevented from being adversely affected, and "optical recognizability" of the moving vehicle is promoted.

Figure 8C:
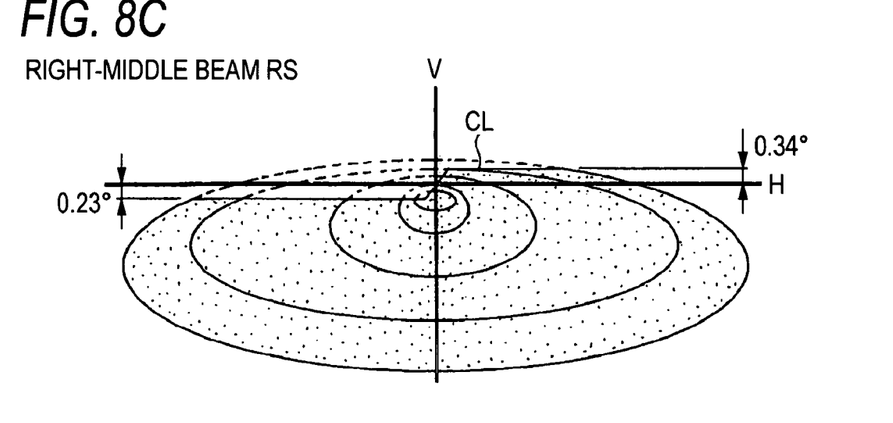

In "right-middle beam," the right-high beam shade RS is rotated so as to be disposed on an upper side, as shown by FIG. 8C. The light distribution pattern is formed by a light distribution pattern in which the cut line CL on the right side of the light distribution vertical line V is slightly higher than that of the left side, and which includes the cut line CL at a position higher than the light distribution horizontal line H by an angle 0.34° in the right side region and lower than the light distribution horizontal line H by an angle 0.23° at the right side region, which is symmetric with the light distribution pattern of "middle beam" shown in FIG. 4C in a left and right direction and is effective for right side passing. Further, in right side passing, when the optical axis of the lamp unit 110 is set to an initial state by the leveling mechanism 130 after setting the rotary shade 141A to the right-high beam shade RS, a light distribution pattern of "high beam" in right side passing can be provided.

The rotary shade of Embodiment 2 is not limited to the illustrated four shades, but can have different heights and shapes can be used. Thus, a light distribution pattern of other "middle beam" or "low beam" in right side running with a different light distribution pattern having a different position of the cut line can be provided.

Embodiment 3

Figure 9:
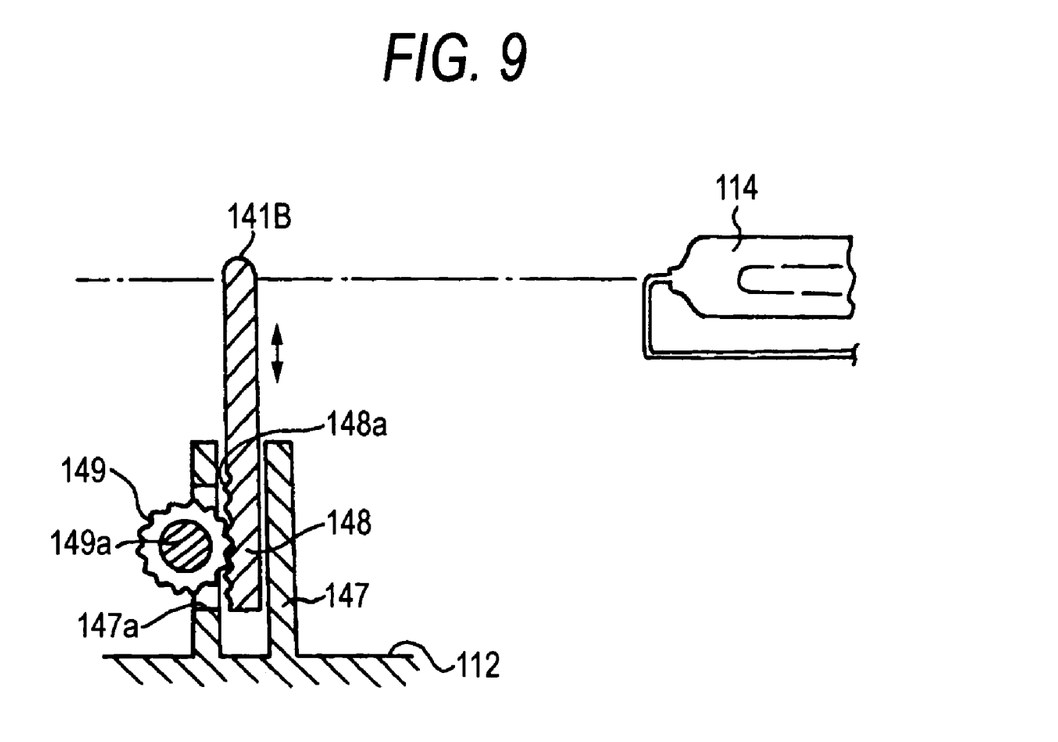
FIG. 9 is a sectional view of a shade switching mechanism of Embodiment 3.

FIG. 9 is a sectional view of a shade provided for a lamp unit of Embodiment 3, where the shade is formed as a straight advancing shade. A guide 147 formed by a shape of a rectangular cylinder is erected to be directed to an upper side from an inner bottom face of the holder 112 of the lamp unit 110, and a support shaft 148 is inserted into the guide hole 147 slidably in an up and down direction. An upper portion of the support shaft 148 is integrally provided with a straight advancing shade 141B constituted by a necessary shape. A portion of a side face of the support shaft 148 is made to face an opening groove 147a provided on one side of the guide 147 and a portion thereof is formed with a rack 148a along the up and down direction. A pinion 149 is arranged inside the holder 112 of the lamp unit 120 and is brought in mesh with the rack 148a. A rotating shaft 149a of the pinion 149 is projected outside by penetrating the one side of the holder 112 similar to the rotating shaft 143 of Embodiment 1. The driven helical gear (144) is attached to an end portion of the rotating shaft 149a similar to Embodiment 1 and is brought in mesh with the drive helical gear (145) attached to the rotating output shaft of the shade motor (146).

According to Embodiment 3, the pinion 149 is rotated by rotating the rotating shaft 149a by way of the drive helical gear and the driven helical gear by driving the shade motor 146 by the shade switching circuit 24. The support shaft 148 is moved reciprocally in the up and down direction by bringing the pinion 149 and the rack 148a in mesh with each other, the straight advancing shade 141B integral with the support shaft 148 is moved in the up and down direction, a height of an upper edge thereof is changed, and a range of blocking light emitted from the discharge bulb is changed. Thus, the respective light distribution patterns of "low beam" and "high beam," similar to those of Embodiment, 1 can be provided. Setting to "middle beam" as in Embodiment 1 can be carried out by deflecting the optical axis of the lamp unit 110 to a lower side by the leveling mechanism 130 so that it is set to the light distribution pattern of "high beam." According to the shade switching mechanism of Embodiment 3, the cut line is switched by moving the straight advancing shade 141B in the up and down direction and therefore, the cut line can be switched more swiftly than that by the shade switching mechanism of controlling the position of rotating the rotary shade as in Embodiment 1.

When the shade switching mechanism of Embodiment 3 is used, beam switching of "high beam," "low beam" and "middle beam" of Embodiment 1 and beam switching of "high beam," "low beam" and "high-middle beam" of Embodiment 2 can be realized. The shade switching mechanism of Embodiment 3 is designed to change the height of the shade having the same shape and, therefore, the height position of the cut line of the light distribution pattern can be controlled continuously and fine control of the light distribution pattern can be realized. Although according to the shade switching mechanism of Embodiment 3, it is difficult to change the shape of the cut line as in Embodiments 1, 2, and therefore, it is difficult to realize "right-middle beam" of Embodiment 2, and although "low-middle beam" thereof slightly differs in the shape of the cut line, a similar light distribution pattern can be realized.

The shade switching mechanism according to the invention is not limited to the particular implementations of Embodiments 1, 2, 3 with respect to controlling the position and the shape of the cut line in the light distribution pattern. In switching the beams, the beams can be formed to switch not only by the beam change switch, but also based on the type of automobile, navigation information equipped to an automobile, image taking information of a camera equipped to an automobile or the like.

Other implementations are within the scope of the claims.

What is claimed is:

1. A vehicle headlamp comprising:
   a lamp having shade switching means for providing a light distribution pattern by blocking a portion of light emitted from a light source, wherein the headlamp is arranged to provide a high, a low beam and a middle beam, and wherein:
   the headlamp has a first state in which the headlamp provides a high beam;
   the headlamp has a second state in which the headlamp provides a low beam having a cut line; and
   the headlamp has a third state in which the headlamp provides a middle beam having a cut line in a higher position than the cut line of the low beam, wherein an optical axis of the headlamp in the middle beam directs lower than an optical axis in the high beam and the low beam;
   the vehicle headlamp further comprising:
   a light distribution pattern switching controlling means for controlling the shade switching means in response to receiving an instruction to switch the light distribution pattern; and
   a leveling means for controlling deflection of an optical axis of the lamp in a vertical direction;
   wherein the light distribution pattern switching controlling means is adapted to control the shade switching means and to control the leveling means in switching the light distribution pattern.

2. The vehicle headlamp according to claim 1, wherein the shade switching means is adapted to change at least a height of a cut line in the light distribution pattern, and
   the light distribution pattern switching controlling means is adapted to control an inclination in an up and down direction of the optical axis of the lamp by the leveling means in correspondence with the height of the cut line of the shade switching means.

3. The vehicle headlamp according to claim 2, wherein a time of starting to control the leveling means is earlier than a time of starting to control the shade switching means.

4. The vehicle headlamp according to claim 2, wherein a time period of controlling the leveling means and a time period of controlling the shade switching means are substantially the same.

5. The vehicle headlamp according to claim 2, wherein the light distribution pattern switching controlling means is adapted to control the shade switching means such that the cut line is constituted by a height substantially the same as a height of a cut line of the high beam and to control the leveling means such that the cut line is formed by a height of a cut line requested for a remote optically recognizing beam in response to receipt of an instruction of switching to a light distribution pattern of the remote optically recognizing beam.

6. The vehicle headlamp according to claim 5, wherein a time of starting to control the leveling means is earlier than a time of starting to control the shade switching means.

7. The vehicle headlamp according to claim 5, wherein a time period of controlling the leveling means and a time period of controlling the shade switching means are substantially the same.

8. The vehicle headlamp according to claim 5, wherein the shade switching means includes a rotary shade adapted to change the height of the cut line at a plurality of rotational positions, and
   the rotational shade is adapted to form at least light distribution patterns of the low beam and the high beam.

9. The vehicle headlamp according to claim 8, wherein a time of starting to control the leveling means is earlier than a time of starting to control the shade switching means.

10. The vehicle headlamp according to claim 8, wherein a time period of controlling the leveling means and a time period of controlling the shade switching means are substantially the same.

11. The vehicle headlamp according to claim 1 wherein the high beam has a cut line in a higher position than the cut line of the middle beam.

* * * * *